(12) United States Patent
De Wilde

(10) Patent No.: US 8,033,578 B2
(45) Date of Patent: Oct. 11, 2011

(54) COUPLING BETWEEN TWO BODIES

(75) Inventor: Gerrit Jan De Wilde, AH Anerveen (NL)

(73) Assignee: Widee B.V., Lutten (NL)

( * ) Notice: Subject to any disclaimer, the term of this patent is extended or adjusted under 35 U.S.C. 154(b) by 0 days.

(21) Appl. No.: 11/994,563

(22) PCT Filed: Jul. 3, 2006

(86) PCT No.: PCT/NL2006/050161
§ 371 (c)(1),
(2), (4) Date: Jul. 21, 2008

(87) PCT Pub. No.: WO2007/004880
PCT Pub. Date: Jan. 11, 2007

(65) Prior Publication Data
US 2008/0309081 A1     Dec. 18, 2008

(30) Foreign Application Priority Data
Jul. 3, 2005  (NL) .................................. 1029412

(51) Int. Cl.
*F16L 19/08* (2006.01)
(52) U.S. Cl. ........................................ 285/340
(58) Field of Classification Search .............. 285/318, 285/340, 307, 321, 345
See application file for complete search history.

(56) References Cited

U.S. PATENT DOCUMENTS

| | | | | |
|---|---|---|---|---|
| 1,440,207 A | * | 12/1922 | Burns | 285/340 |
| 1,711,995 A | * | 5/1929 | Erickson | 285/318 |
| 2,950,132 A | * | 8/1960 | Kocsuta | 285/307 |
| 3,204,988 A | * | 9/1965 | Dunton et al. | 285/40 |
| 4,676,533 A | | 6/1987 | Gerondale | |
| 5,160,179 A | * | 11/1992 | Takagi | 285/340 |
| 5,527,073 A | * | 6/1996 | Readman | 285/340 |
| 5,695,224 A | * | 12/1997 | Grenier | 285/104 |
| 5,816,627 A | * | 10/1998 | Readman | 285/340 |
| 6,450,550 B1 | * | 9/2002 | Cornwell | 285/340 |
| 7,523,966 B2 | * | 4/2009 | O'Neill et al. | 285/340 |
| 7,530,606 B1 | * | 5/2009 | Yang | 285/340 |
| 7,549,679 B2 | * | 6/2009 | Brosius et al. | 285/340 |
| 2002/0185868 A1 | | 12/2002 | Snyder et al. | |
| 2003/0067170 A1 | | 4/2003 | Snyder et al. | |
| 2005/0146133 A1 | | 7/2005 | Snyder et al. | |

FOREIGN PATENT DOCUMENTS

| | | |
|---|---|---|
| DE | 3322202 B1 | 1/1984 |
| WO | 0052365 A1 | 9/2000 |
| WO | 02070940 A1 | 9/2002 |
| WO | 2004113777 A1 | 12/2004 |

* cited by examiner

*Primary Examiner* — David E Bochna
(74) *Attorney, Agent, or Firm* — Harness, Dickey & Pierce, P.L.C.

(57) ABSTRACT

A coupling between a first body with a hole and a cylindrical end zone of a second body to be inserted therein, in which hole extend elastically deformable tongues, the free end edges of which tongues lie on a circle, the diameter of which is smaller than the outer diameter of the end zone, which tongues bend in the insertion direction when the end zone is inserted and scrape over the surface thereof with their free edges such that after inserting the end zone over some distance the movement in a backward direction is blocked. The end edges of the tongues have an inclining position corresponding to a part of a helix, so that during a relative rotation of the two bodies, the form of the helix is followed whereby an axial relative movement also occurs and the end zone can be removed from the hole.

4 Claims, 9 Drawing Sheets

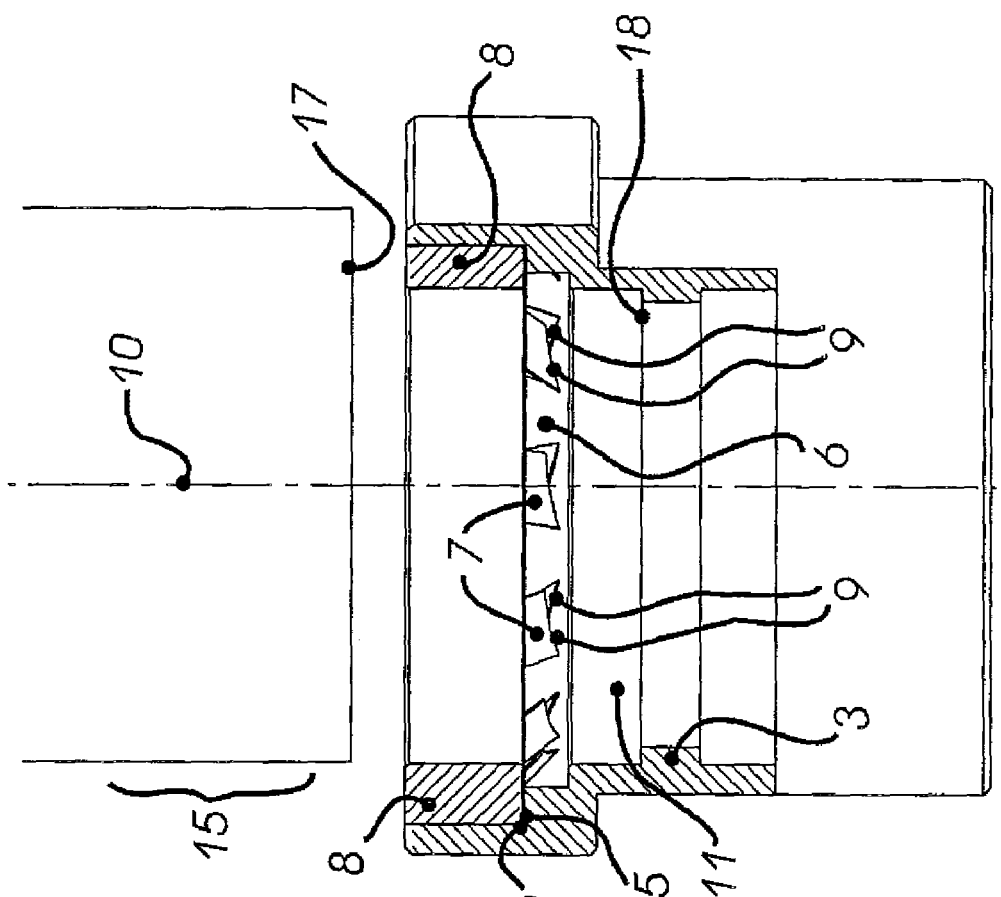
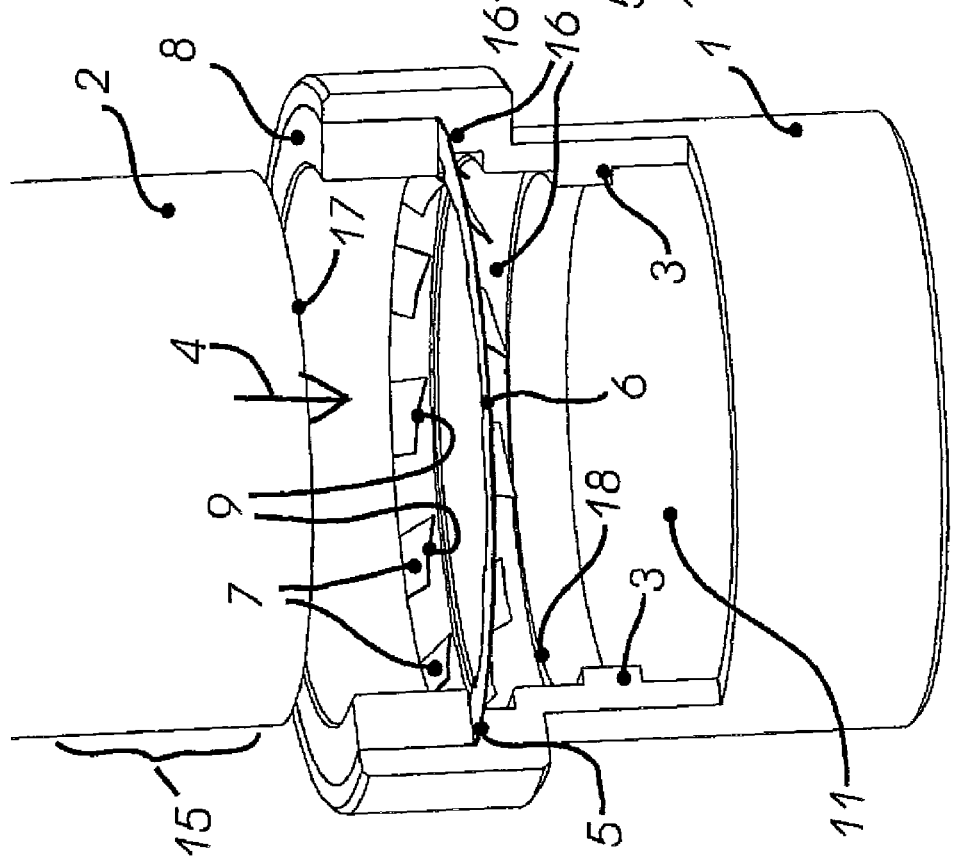
FIG 1a
FIG 1b

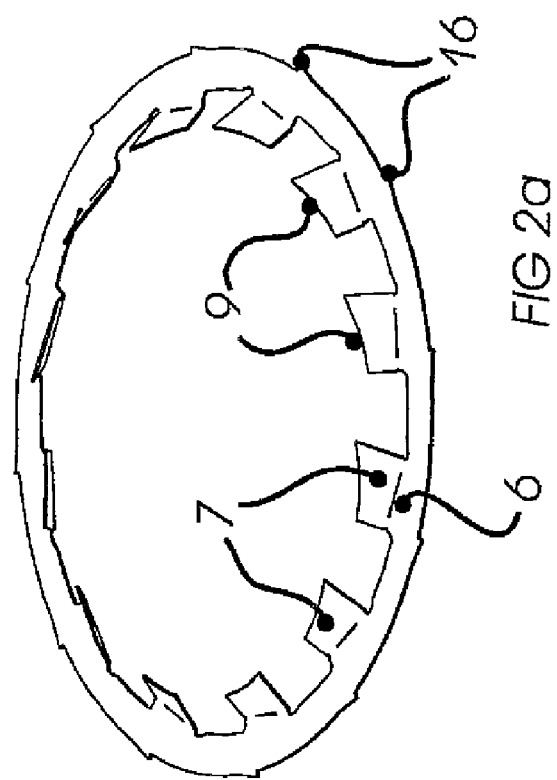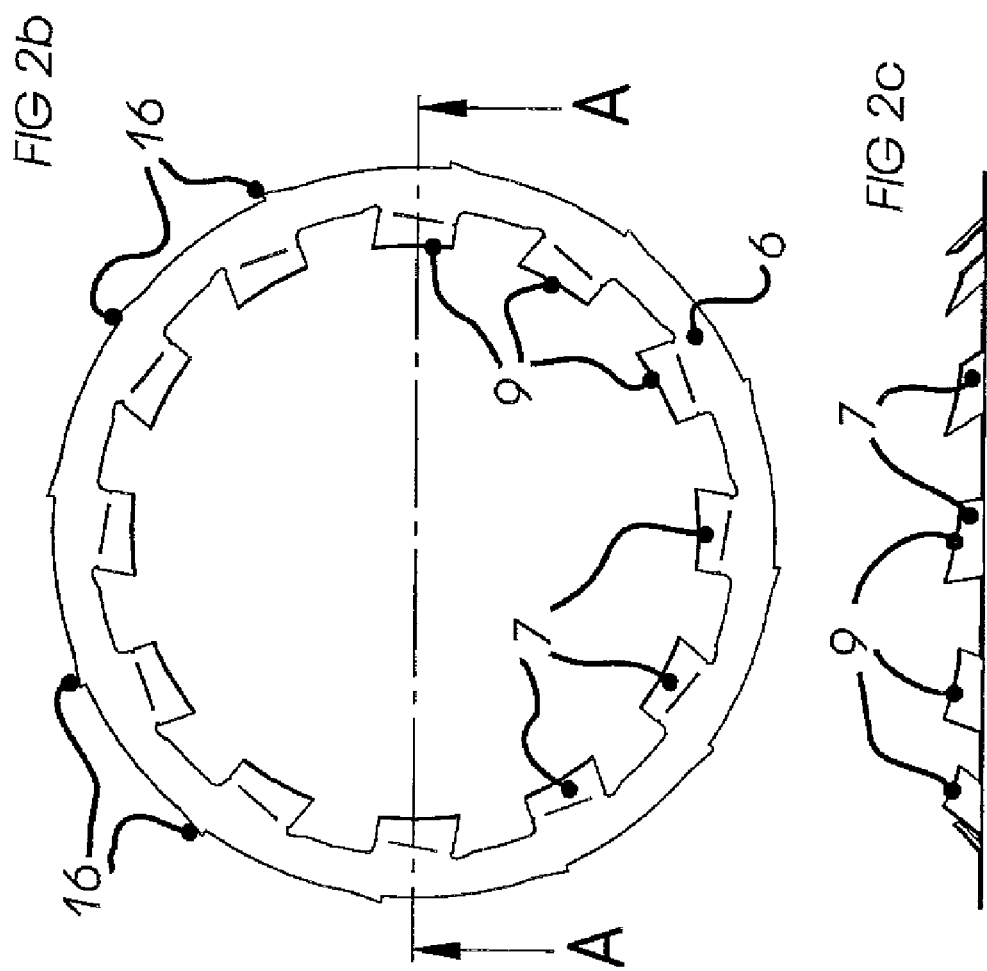

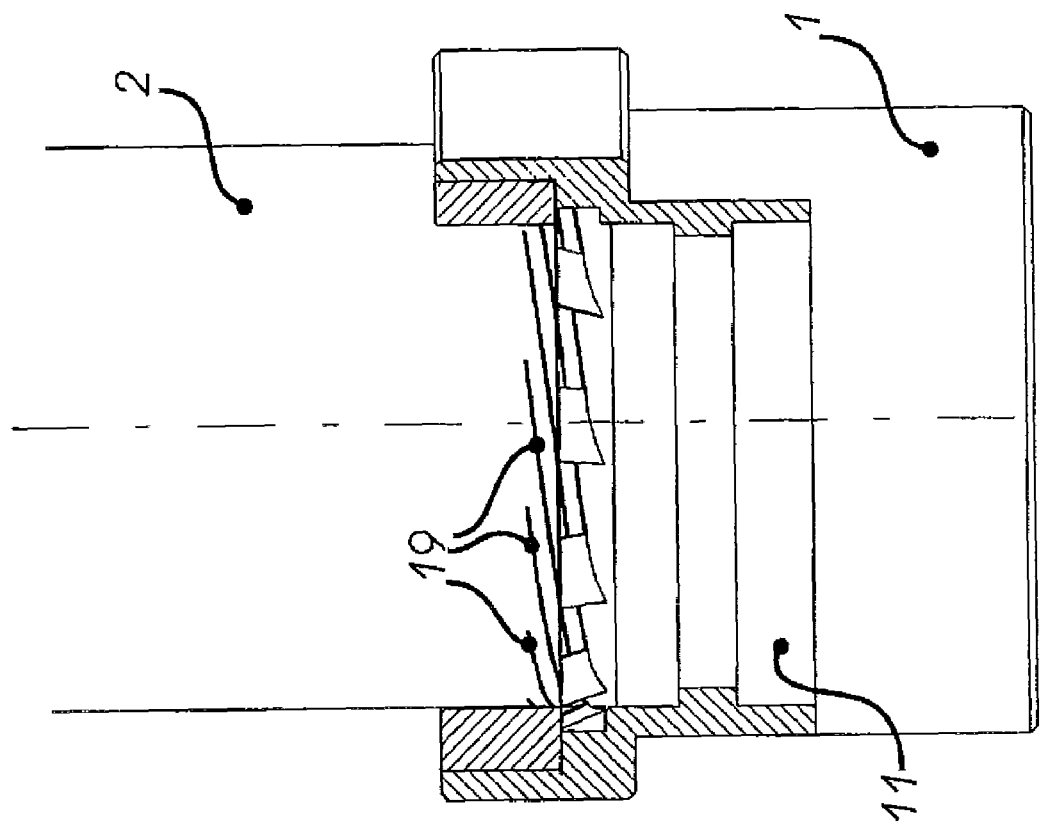
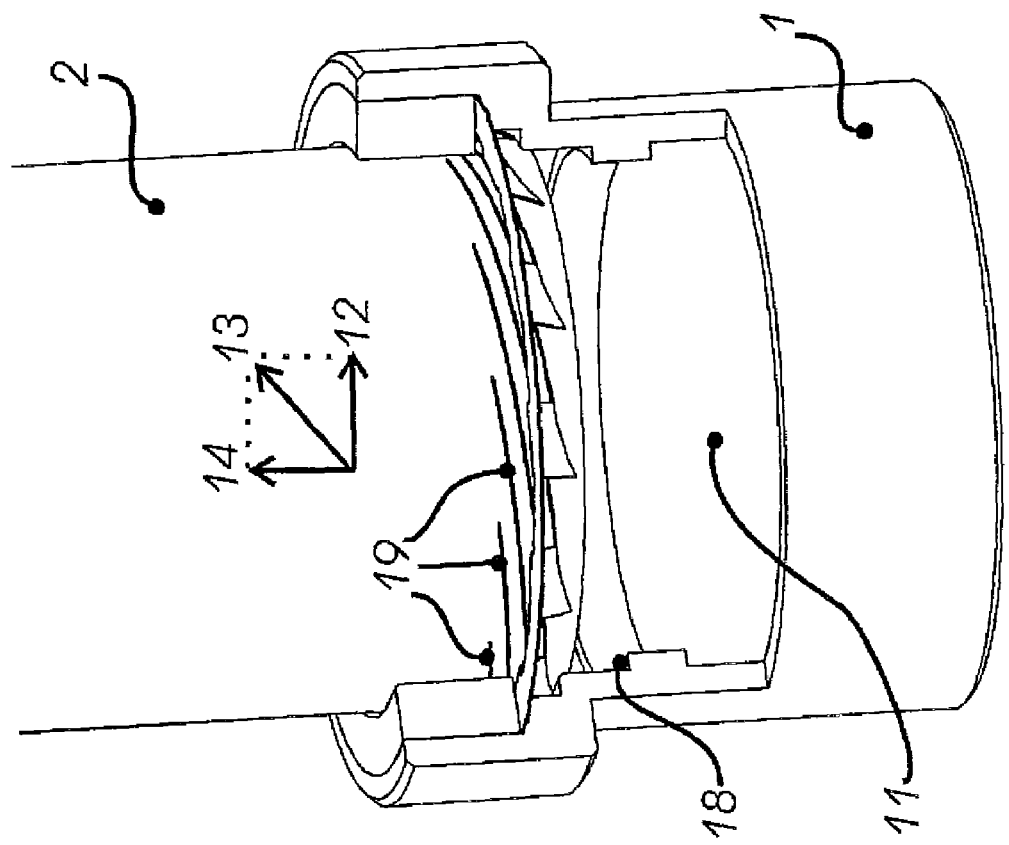

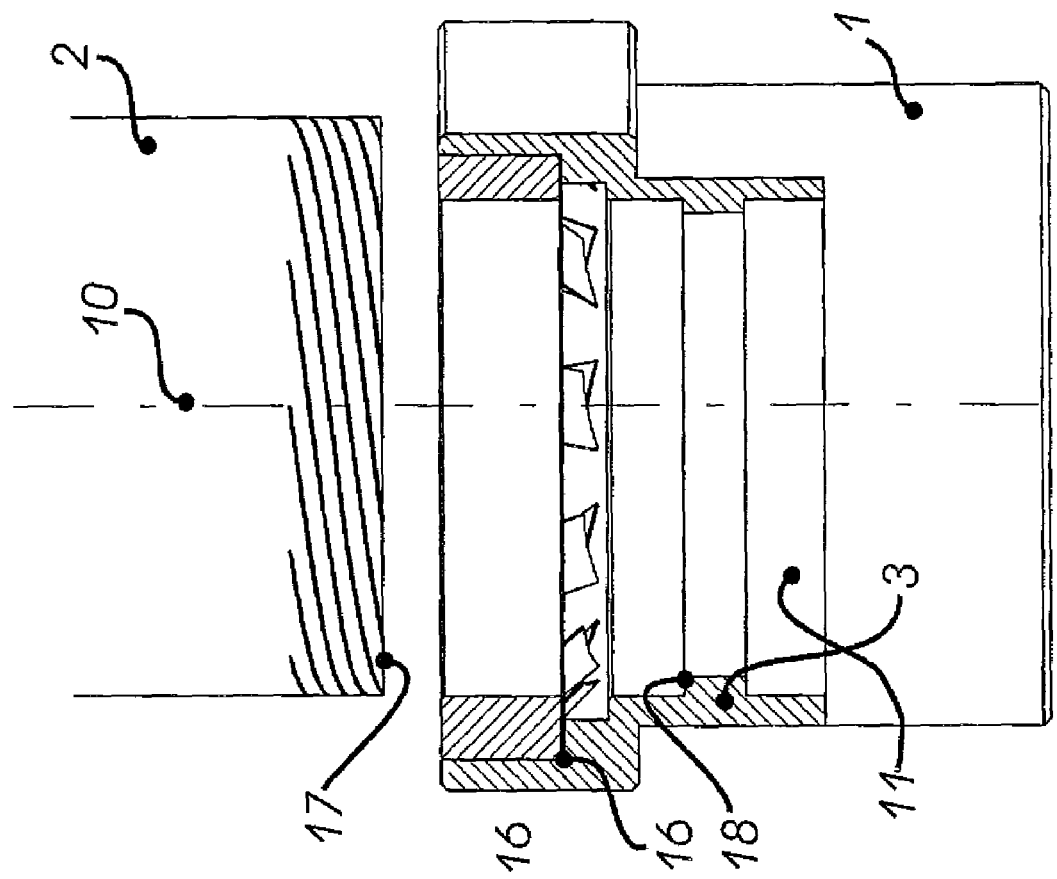
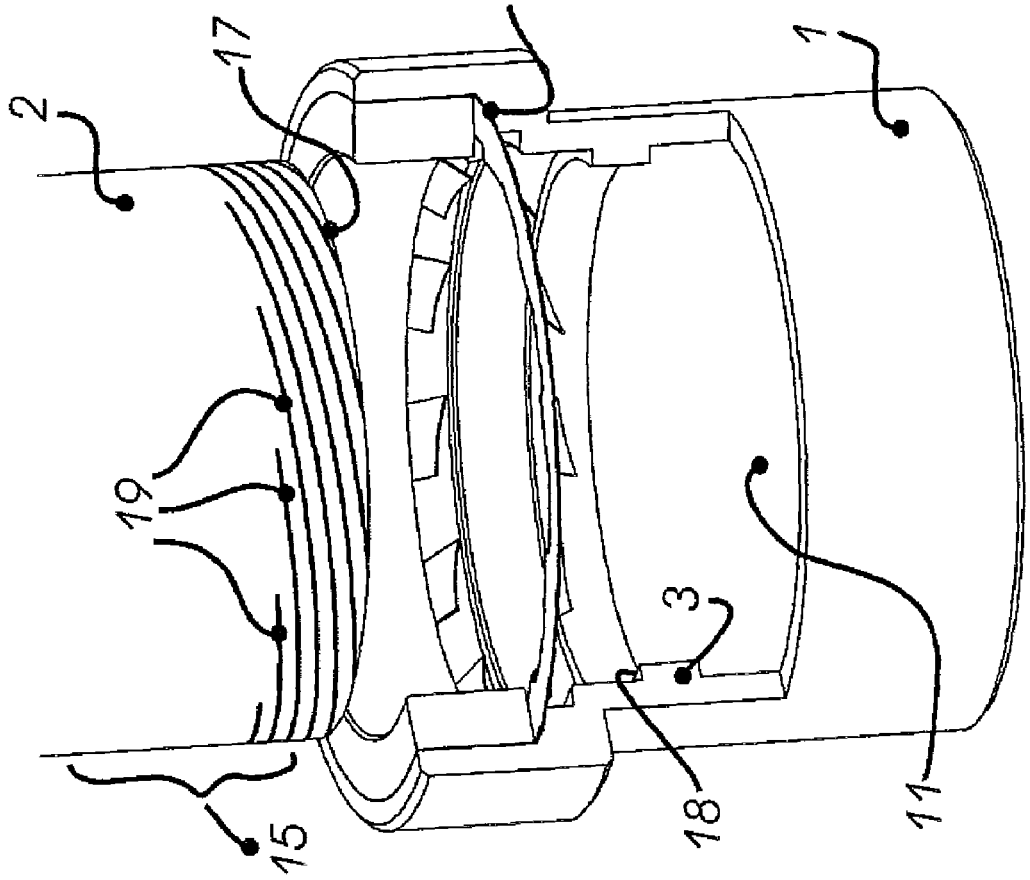
FIG 5b
FIG 5a

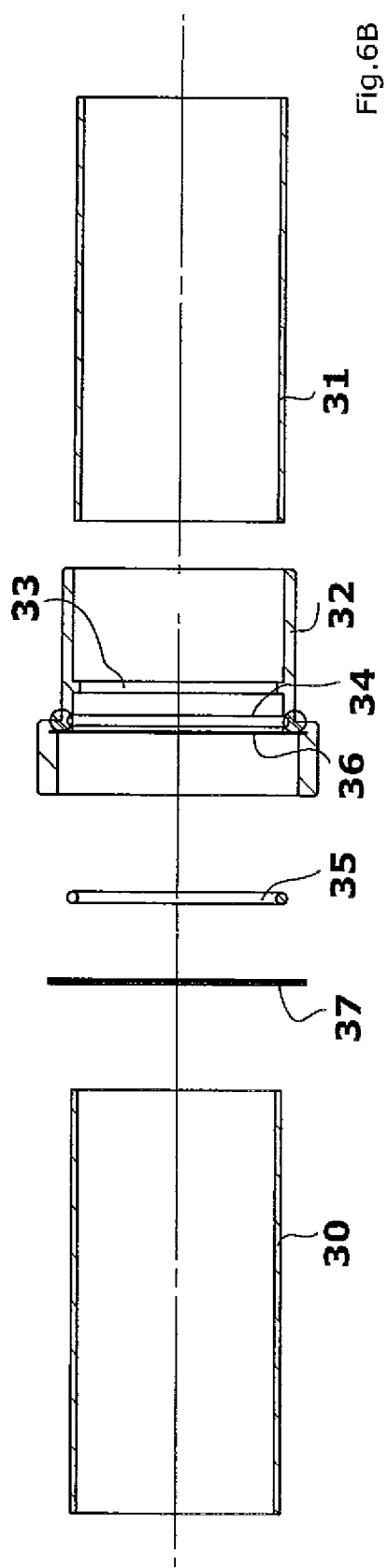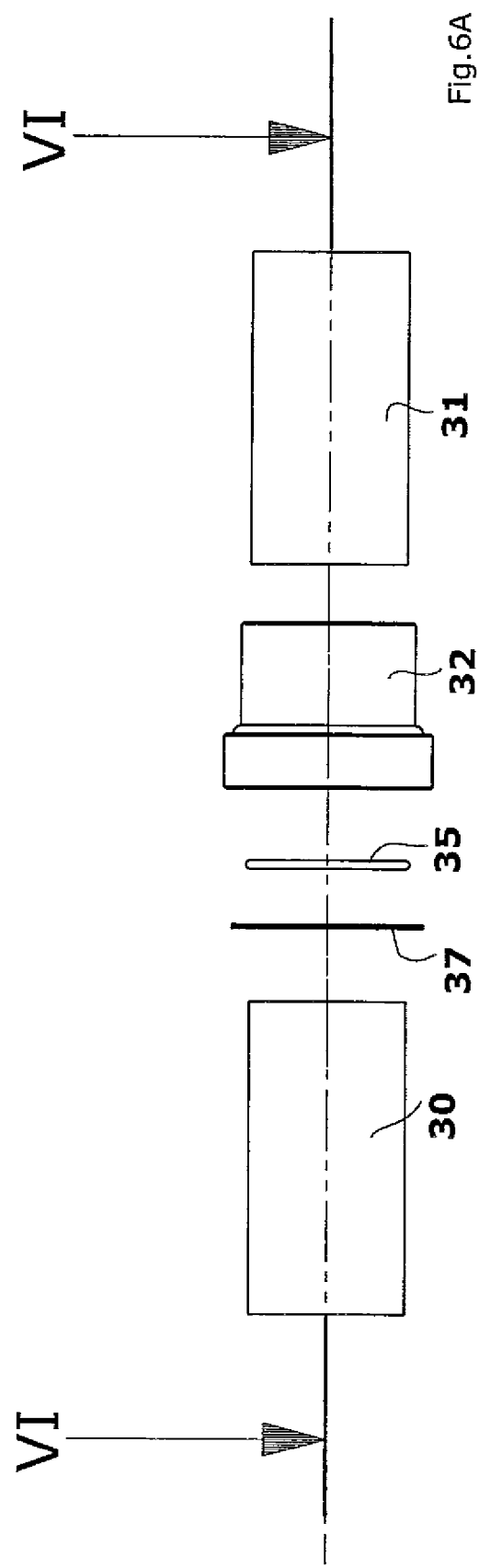

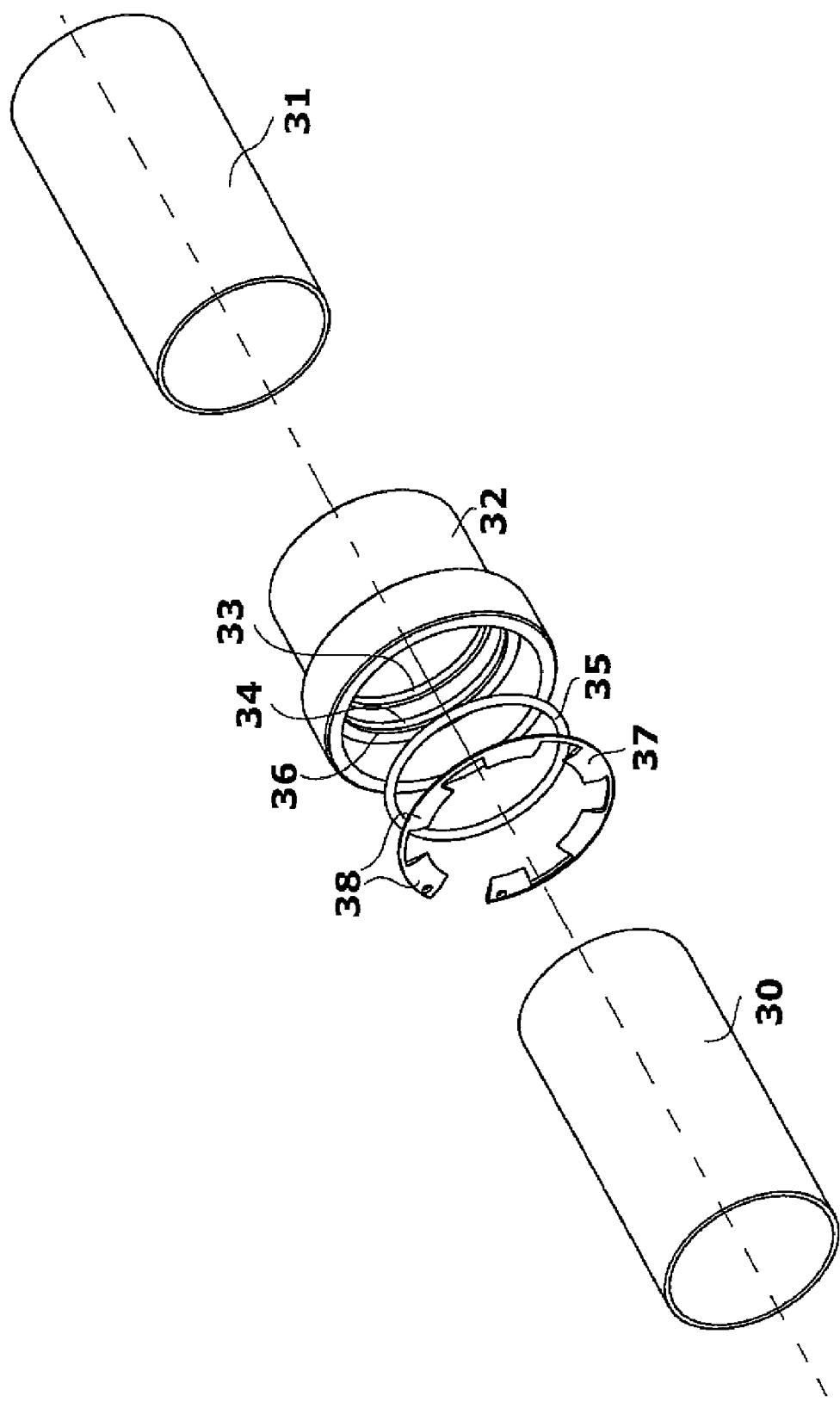

COUPLING BETWEEN TWO BODIES

CROSS-REFERENCE TO RELATED APPLICATIONS

This application is a national entry of PCT/NL2006/050161 filed Jul. 3, 2006 entitled "Coupling Between Two Bodies", which claims priority to Netherlands Patent Application NO. 1029412 filed Jul. 3, 2005 which is pending.

BRIEF SUMMARY OF THE INVENTION

The invention relates to a coupling between a first body with a cylindrical hole with an axis and a cylindrical end zone of a second body to be inserted therein in an axial insertion direction, in which hole and/or on the surface of which end zone extend a number of elastically deformable tongues which are fixedly connected to the relevant body and ordered in angularly regular manner, for instance equidistantly, the free end edges of which tongues lie substantially on the peripheral plane of an imaginary, substantially rotation-symmetrical body, respectively the diameter of which is smaller than the outer diameter of the end zone of the second body or the diameter of which is greater than the diameter of the hole, which tongues extend at an angle to the axial direction such that, when said end zone is inserted, they bend in the insertion direction and scrape over the surface thereof with their free edges such that after insertion of the end zone over some distance the movement in backward direction relative to the insertion direction is blocked.

Such a coupling is known from EP-A-0 378 035, EP-A-0 212 883, EP-A-0 579 194, EP-A-0 294 948, EP-A-0 972 981 and DE-A-197 23 594. Relative to this stated prior art it is an object of the invention to embody a coupling between two bodies such that it can be released very easily without specific uncoupling operations and the use of tools intended specifically for this purpose, while in the coupled situation the bodies are nevertheless coupled to each other very firmly and even, ostensibly, inseparably.

These and other objects are realized with a coupling of the type specified in the preamble which has the feature that the end edges of the tongues have an inclining position corresponding to a part of a helix, as a consequence of which, when the second body is rotated around the axis relative to the first body, the form of said helix is followed whereby an axial movement also occurs and said end zone of the second body can be removed from the hole of the first body.

The tongues can extend on the inner side of the hole but, alternatively, can also be situated on the surface of said end zone. It is recommended for safety reasons when the coupling is effected that the tongues are situated inside the hole, since there is otherwise the danger of the person effecting the coupling being injured by the possibly sharp tongues.

The tongues can consist of any suitable material. A sufficiently strong plastic such as for instance ABS is therefore suitable. Cheaper and very reliable is an embodiment where the tongues consist of metal, in particular steel.

In a preferred embodiment, the coupling according to the invention has the special feature that the tongues form part of a monolithic unit, also comprising a substantially flat ring which is at least partially received in the wall of the hole of the first body. This embodiment is relatively easy to manufacture by punching and pressing, whereby production costs will be relatively low.

This latter embodiment can advantageously have the special feature that the ring has a number of protrusions which during mutual rotation of the two bodies in the stated manner brace themselves against the material of the body to which the ring is fixedly connected. When the end zone of the second body is displaced outward by rotation, a distribution of forces thus takes place over the whole periphery of the ring, which in turn distributes these forces over the protrusions serving as barbed hooks. It will therefore be apparent that these protrusions are preferably distributed regularly, for instance angularly equidistant, over the periphery of the ring. They can lie in the same plane as the ring or also be embodied as additional tongues pressed out of the plane of the ring.

According to yet another aspect of the invention, the coupling according to the invention has the special feature that each tongue has a main direction in axial projection which differs from the radial direction and is in a direction opposite the direction of rotation when the end zone of the second body is moved outward. A more or less radially directed additional force is hereby exerted on each tongue during rotation of the cylindrical end zone of the second body, whereby the ring has a slight tendency to expand, which somewhat facilitates the helical rotation.

In a specific embodiment, the coupling according to the invention has the special feature that the hole has an axial stop for bounding the distance over which said end zone of the second body can be inserted into the hole. Using this embodiment the coupling can be effected in very simple manner by inserting the cylindrical end zone of the second body with some axial force into the cylindrical hole in the first body, wherein the axial insertion distance is determined by said axial stop. This axial stop can for instance be embodied as an annular shoulder, against which the leading edge of the end zone of the second body comes to lie.

According to a determined aspect of the invention, the coupling has the special feature that the first body is a tube or tube stub.

According to yet another aspect of the invention, the coupling can have the special feature that at least said end zone of the second body consists of plastic, concrete, wood or metal, such as iron, copper or aluminum. It is important that the material of the tongues is chosen such that it can co-act effectively in the above described manner with the material of the second body.

An embodiment which is easy to assemble has the specific feature that the ring has an interruption and is accommodated clampingly while being elastically deformed in an annular recess in the relevant wall of the relevant body. In order to prevent unintended rotation of the ring in the situation where the bodies must be separated from each other by relative rotation, use can be made of means preventing such a rotation. The above specified coupling can have for this purpose the special feature that the ring has a number of protrusions which during mutual rotation of the two bodies in the stated manner brace themselves against the material of the body to which the ring is fixedly connected. Alternatively, the annular recess can have a local interruption in the form of a stop wall, with which an end of the ring at the position of the interruption can co-act during said rotation. Unintended rotation of the ring is effectively prevented with both variants.

A specific embodiment of the coupling according to the invention has the special feature that the ring is secured against rotation in both directions.

Such a coupling is suitable for carrying out a method for establishing such a coupling, the method comprising the steps of:

(a) displacing the surface of the related body over some distance in axial direction along the end edges; and (b) displacing the end zone of the second body axially further into the hole by relative rotation of the two bodies.

According to a further aspect of the invention the coupling has the special feature that upstream relative to the insert direction a sealing ring is present on the first or the second body. As a result of the upstream position of the sealing ring it is prevented that a defective sealing is caused to occur as a result of scratches caused by the end edges of the tongues in the surface of the related body cooperating therewith.

According to a last aspect of the invention the coupling has the special feature that the sealing ring is accommodated in an annular groove broadening in the insert direction, in a way such that after inserting the cylindrical end zone of the second body in the hole and subsequently displacing same in the opposite direction the ring is caused to cooperate in a clamping and sealing manner with the bottom of the annular groove and the facing surface of the related body.

During establishing of the coupling of this type a circumferential wedge shaped space is created between the broadening annular groove and the cylindrical surface of the related body. Initially the elastic sealing ring will move together with the surface of the related body until it is blocked for further displacement, particularly by the presence of the tongues that for instance may form part of a ring. During a further axial displacement the sealing ring shifts over the related surface in axial direction, until the operator is of the opinion that the insert displacement is sufficient or until a further displacement is blocked due to the presence of stopping means. Subsequently a backward axial displacement is caused by a suitable relative rotation of the two bodies, resulting in that the sealing ring is fixed by a wedge operation in a clamping manner against the bottom of the groove tapering in that backward direction. In the case in which the coupling is loaded by medium under pressure the sealing ring will be urged into the described wedge-shaped space, which further enhances the sealing operation.

A coupling according to the invention can for instance be applied for the coupling of two tubes. A two-sided coupling sleeve can thus for instance be coupled at both its ends to respective tubes by means of two associated couplings according to the invention. Such a sleeve can optionally be an outer sleeve or an inner sleeve. In the case of an outer sleeve, the connection between the tubes for coupling to each other can be realized such that these tubes come to rest with their free end edges against each other. A completely medium-tight sealing can further be ensured by making use of suitable sealing means, for instance sealing rings present on the inner surface of the outer sleeve.

The invention is not only suitable for coupling tubes but in general for coupling a body provided with a hole to another body having at least a cylindrical end zone, for instance a solid rod. The coupling according to the invention can thus serve to place an outside letterbox on a for instance wooden post. Table legs can also be connected to a tabletop provided with holes using the coupling according to the invention. A hammerhead provided with a suitable hole can also be connected to a handle with the coupling according to the invention.

The given examples are not limitative and serve only as an indication of possible applications of the invention. What is important is that an established coupling cannot be released by exerting only an axial tensile force on the two bodies. The connection by means of the coupling according to the invention can only be released by mutually rotating the bodies in the above described manner.

The invention will now be elucidated on the basis of the accompanying drawings.

BRIEF DESCRIPTION OF THE DRAWINGS

FIG. 1a shows a cut-away perspective view of a coupling between two tubes according to the invention at a stage where the tubes to be mutually coupled still lie a distance apart;

FIG. 1b shows a cross-section corresponding with the situation of FIG. 1a;

FIG. 2a is a perspective view of a unit comprising a ring with inward extending tongues and a number of barbed hooks on the outer side;

FIG. 2b shows a bottom view of the ring of FIG. 2a;

FIG. 2c shows the cross-section A-A of FIG. 2b;

FIG. 3b shows a view corresponding with FIG. 1b of the situation of FIG. 3a;

FIG. 4a shows a view corresponding with FIGS. 1a and 3a of the situation a start has been made with uncoupling of the two tubes by mutual rotation;

FIG. 4b shows a view corresponding with FIGS. 1b and 3b of the situation of FIG. 4a;

FIG. 5a shows a view corresponding with FIGS. 1a, 3a and 4a of the final stage in which the uncoupling is fully effected and the tubes have been uncoupled into the situation shown in FIG. 1a;

FIG. 5b is a view corresponding with FIGS. 1b, 3b and 4b of the uncoupled situation shown in FIG. 5a;

FIGS. 6a, 6b and 6c show corresponding exploded views in respectively side view, longitudinal section and perspective view of an alternative;

FIG. 1a shows a first tube 1 and a second tube 2. The first tube has an inner diameter corresponding to the outer diameter of the second tube 2 such that this second tube 2 can be inserted as far as an annular axial stop 3 into first tube 1. The axial insertion direction is indicated with an arrow 4. Lying on an annular shoulder 5 is a steel ring 6 which is provided with twelve inward protruding tongues 7 and which forms a monolithic unit therewith. Reference is also made in this respect to FIGS. 2a, 2b and 2c. As shown clearly in FIGS. 1a and 1b, tongues 7 have a position bent slightly downward in accordance with the insertion direction 4.

Figure 3B:
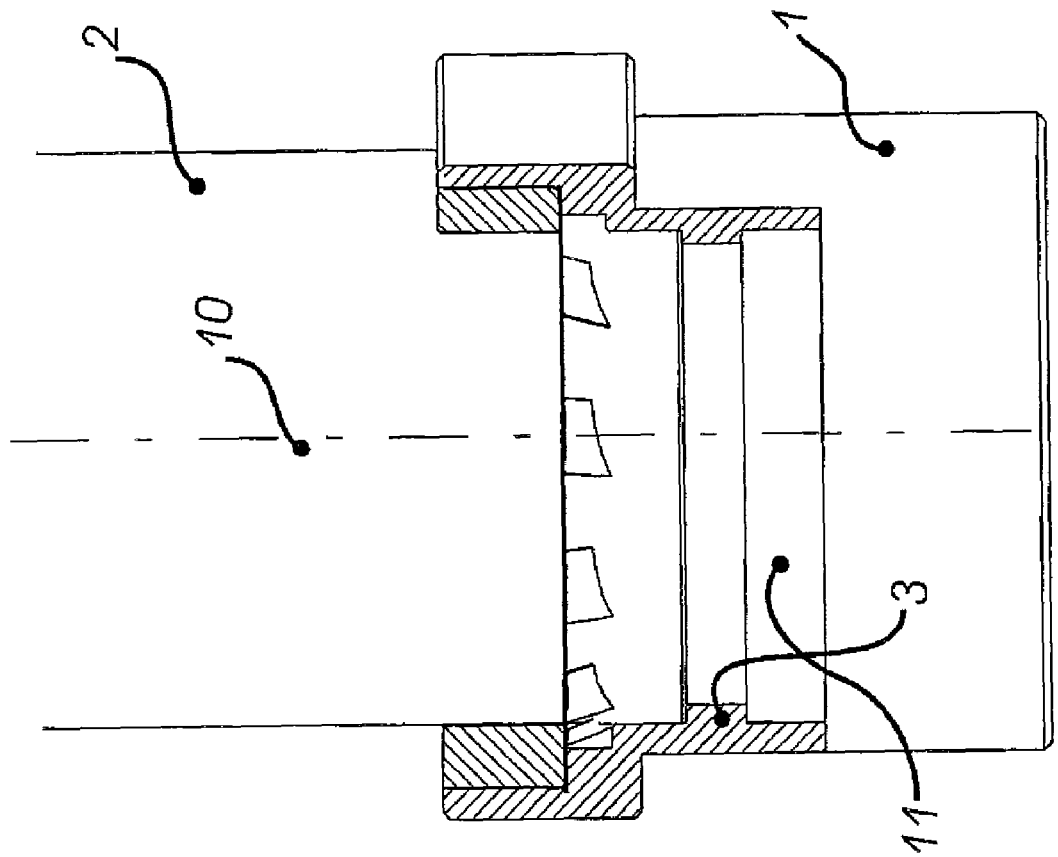

In this embodiment the ring 6 is fixed relative to tube 1 by means of a cylindrical fixation ring 8 which can be connected fixedly to tube 1 by means of screwing, glueing, welding or any other suitable process after insertion of ring 6. It is noted that ring 6 can also be embedded in the first tube 1, for instance if it is manufactured from plastic.

It is essential according to the invention that the end edges 9 of tongues 7 have an inclining position corresponding to a part of a helix. This aspect can be seen particularly well in FIG. 1b and FIG. 2c. As a result of this inclining position the direction 13 (see FIG. 4a) of the helix is formed during mutual rotation 12 of tubes 1 and 2 around axis 10 of hole 11, i.e. the internal cavity of tube 1, whereby an axial displacement 14 occurs, and end zone 15 of second tube 2 can be removed from hole 11 of the first tube.

FIGS. 1a and 1b show the initial stage prior to effecting the coupling.

FIGS. 2a, 2b, 2c show a possible construction of the integral, monolithic steel ring with the tongues 7 and barbed hook-like protrusions 16 extending on the outer side of the ring.

Figure 3A:
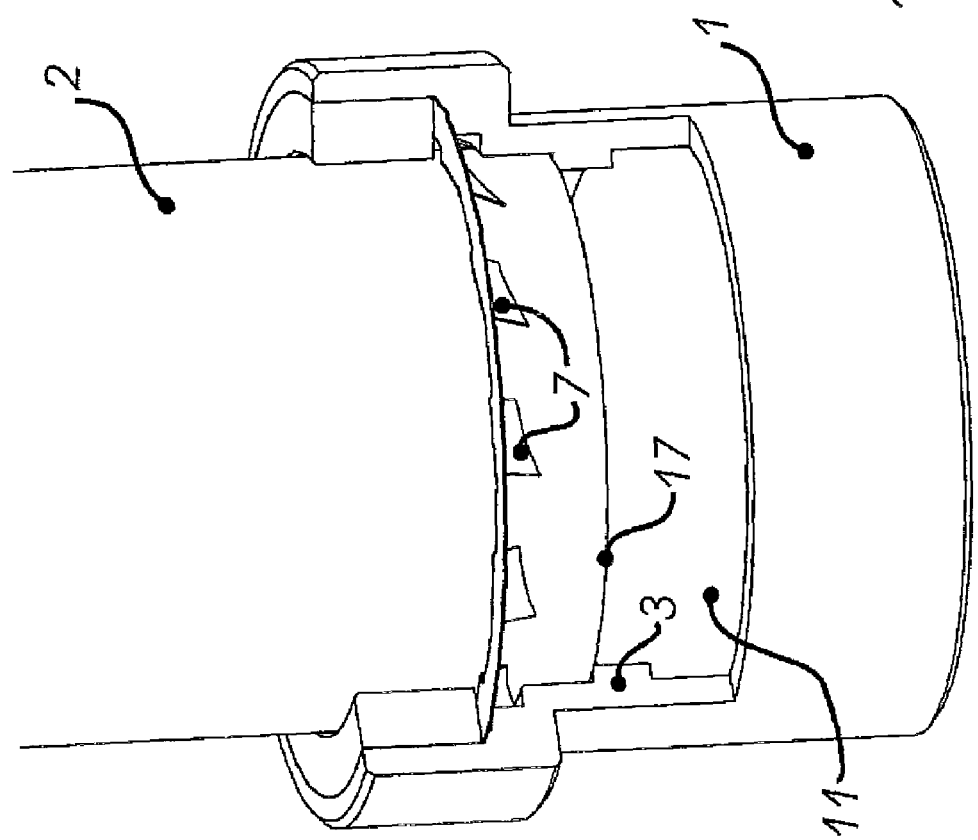
FIG. 3a shows a view corresponding with FIG. 1a of the first stage in which the tube coupling is effected.

FIGS. 3a and 3b show that by axially displacing the second tube 2 with force relative to first tube 1 as according to arrow 4 the tongues 7 are bent further downward by tube 2 such that the leading edge 17 of second tube 2 eventually comes to rest on the upper surface 18 serving as axial stop of the annular axial stop 3. This is the coupled situation according to FIGS. 3a and 3b. Owing to the presence of tongues 7 the backward displacement of second tube 2 relative to arrow 4 is blocked, whereby the coupling between tubes 1 and 2 in this manner is very firm.

As shown in FIGS. 4a and 4b, when tube 2 is rotated relative to tube 1 as according to arrow 12, there occurs a helical movement in accordance with vector 13 which is accompanied by an axial displacement 14, whereby tube 2 is gradually displaced out of tube 1. The sharp steel tongues 7 cause damage to the outer surface of tube 2 in the form of grooves 19 scored therein. Particularly in the case of relatively soft plastics such as PVC, these grooves are clearly visible. This does not however make it impossible to couple tube 2 once again to tube 1 as according to FIGS. 1 and 3.

FIGS. 5a and 5b show the final situation in which tube 2 is wholly separated from tube 1 through continued rotation 12. Grooves 19 then extend over a larger axial area.

FIG. 6 shows a tube coupling according to the invention in exploded view. The coupling is adapted for mutual coupling of two tubes 30 and 31. Use is made for this purpose of a coupling sleeve 32. Tube 31 is pushed into this coupling sleeve 32 until it lies against an annular stop shoulder 33. The coupling between sleeve 32 and tube 31 is fixed, for instance by means of a glue connection.

Sleeve 32 has an annular recess 34 in which a rubber elastic sealing ring 35 is received. This serves for sealing relative to the outer surface of tube 30.

A spring steel ring 37 with tongues 38 placed in a helical position is arranged clampingly under elastic tension in an annular recess 36. This ring is shown particularly clearly in FIG. 6c.

Tube 30 is inserted with force into sleeve 32 and passes the yielding tongues 38 with at least partial elastic deformation and sealing ring 35 until it rests against stop shoulder 33.

The coupling is hereby completed. It will be apparent that tube 31 is fixed sealingly relative to sleeve 32 and that tube 30 seals relative to sleeve 32 by means of sealing ring 35 and can only be removed by suitable rotation from the fixation relative to sleeve 32.

Figure 7:
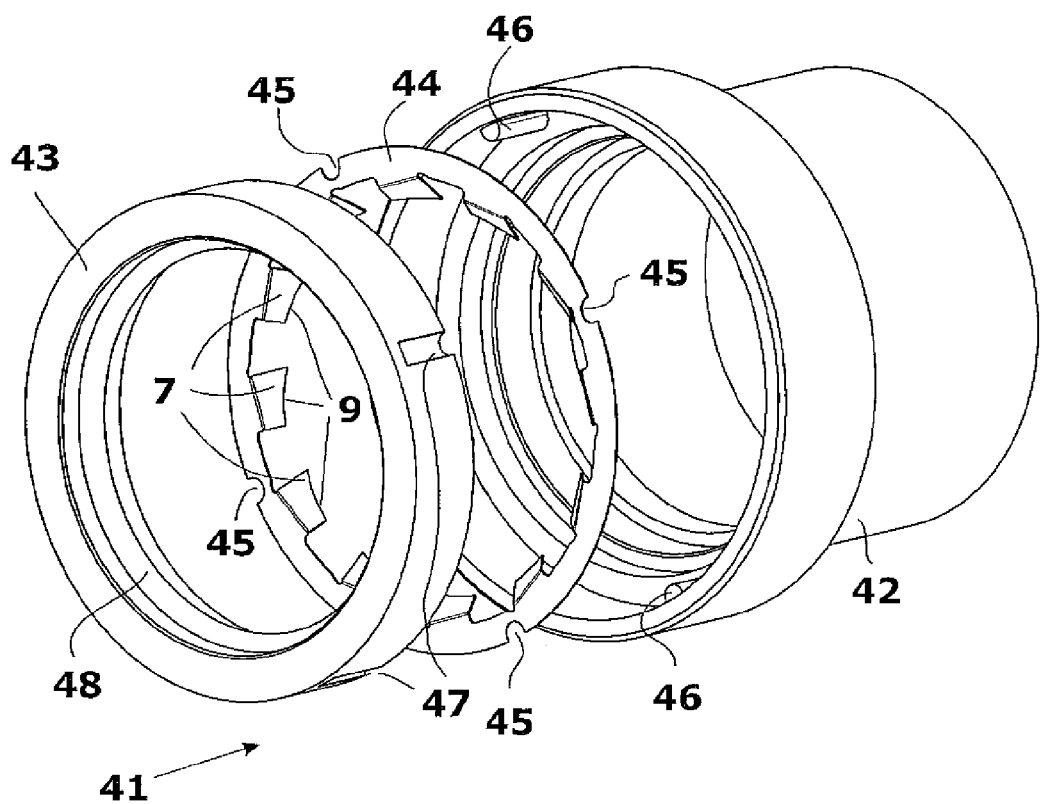
FIG. 7 shows an exploded view of a coupling sleeve according to the invention in yet another embodiment.

FIG. 7 shows a coupling sleeve 41 in exploded view. A rotation-symmetrical bush 42 co-acts with a clamping ring 43 for clamping stainless-steel or spring-steel ring 44 on which tongues 7 are present. The ring has on its outer edge four recesses, all designated with the reference numeral 45. These recesses 45 co-act with elongate protrusions 46 arranged on the inner side of bush 42 such that the rotation of ring 44 relative to bush 42 is blocked in both directions. Clamping ring 43 is provided with correspondingly formed recesses 47.

An O-ring 48 of rubber elastic material serving as sealing element is placed on the inner surface of clamping ring 43. Present for this purpose on the inner surface of ring 43, as will become apparent with reference to the variant according to FIG. 8, is an annular recess in which the O-ring 48 fits partially.

The rotation locking of ring 44 relative to sleeve 42 in two directions is important because it is thereby possible to ensure that, when for instance a tube is inserted over a limited distance into sleeve 41 such that it comes into contact with end edges 9 of tongues 7 of ring 44, a continuous, inward displacement of the tube can be obtained relative to coupling sleeve 41 with a suitable rotation of the inserted tube, as a result of the helical position of edges 9. This is particularly important in the case where a tube has a relatively large diameter as a result of tolerance variations and it is not automatically possible to displace it inward by axial pressure. Once the tube in question has reached its desired end position, an outward displacement can be obtained according to the invention by rotation in reverse direction.

It is noted that the sealing ring 48 co-acting with the outer surface of the inserted tube is placed upstream of the tongues 7. The outer wall of the inserted tube is thereby not damaged by scraping of edges 9, which could result during upstream displacement in an inadequate sealing action of O-ring 48.

Figure 8:
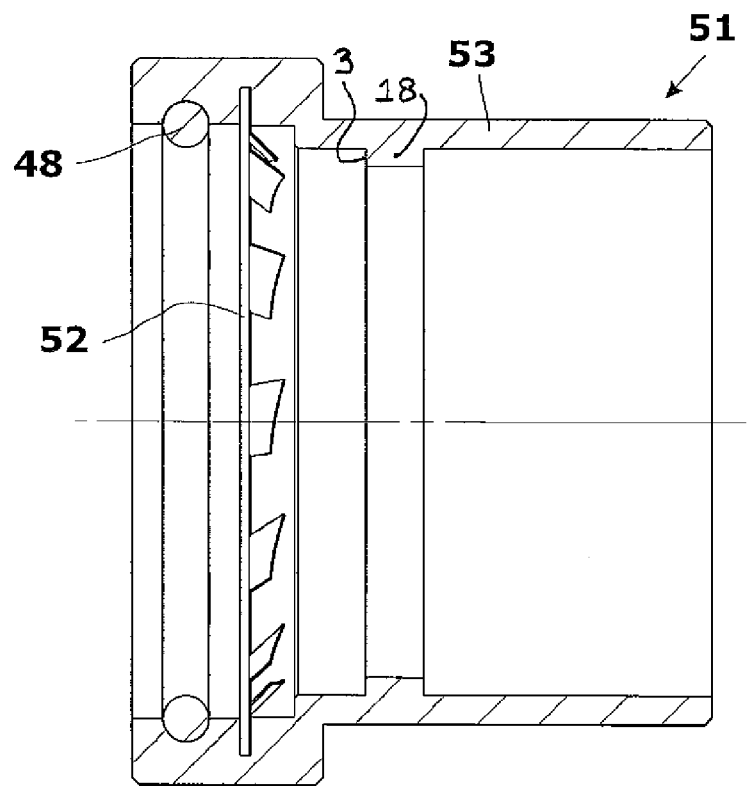
FIG. 8 shows a cross-section through a sleeve in a further embodiment.

FIG. 8 shows a coupling sleeve 51 in which a spring steel ring 52 is formed integrally with the plastic bush 53 of sleeve 51 during the injection moulding process. An excellent rotation locking is hereby realized in both directions. To the extent this is necessary, the edge part of ring 52 encased by plastic could also be provided with a determined profiling in order to further strengthen, if necessary, the anchoring in the plastic.

Figure 9:
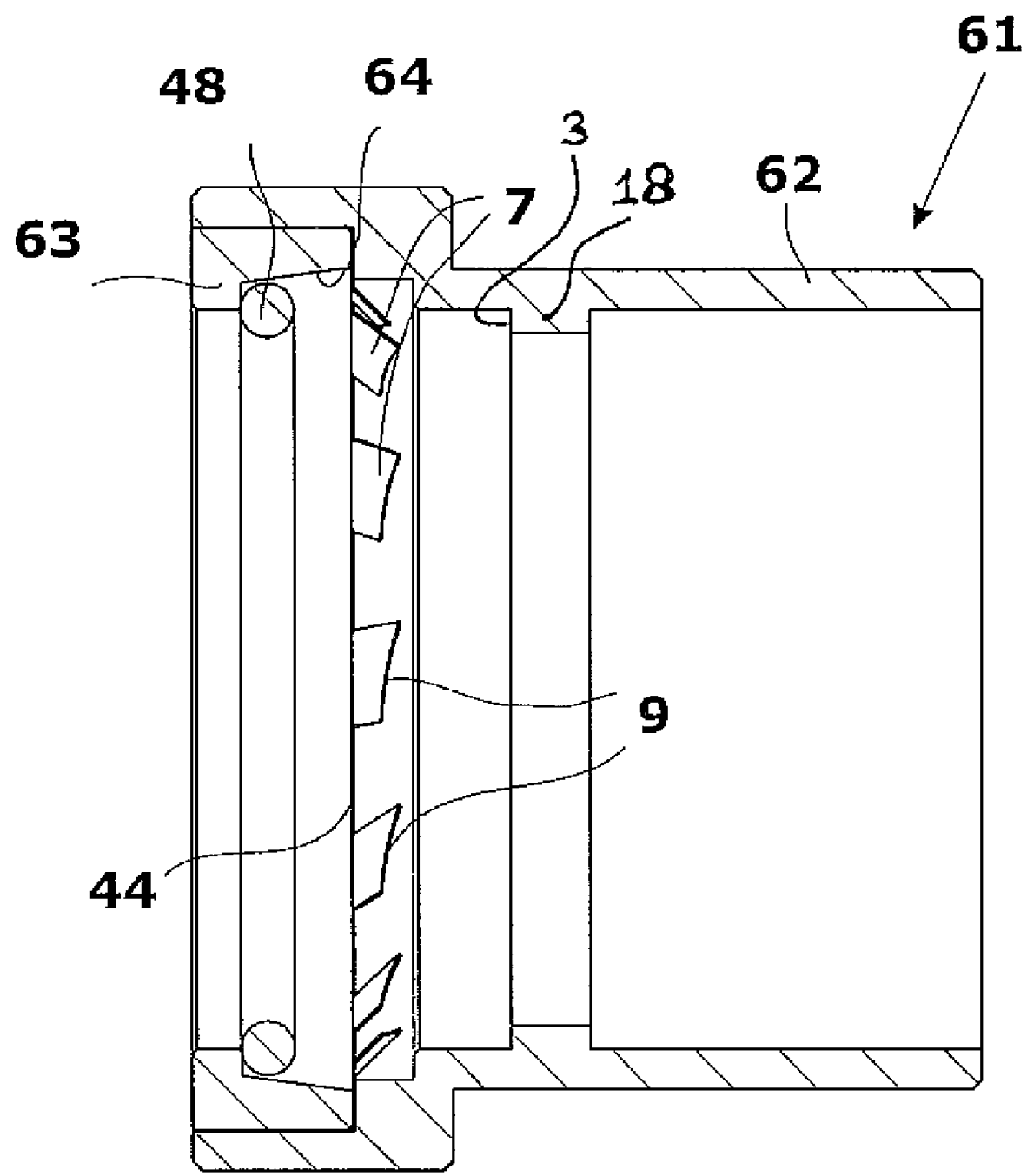
FIG. 9 shows a view corresponding with FIG. 8 of a final embodiment.

FIG. 9 shows a coupling sleeve 61 wherein the steel ring 44 is clamped between a bush 62 and a clamping ring 63 in accordance with the embodiment of FIG. 7. In this embodiment clamping ring 63 has on its inner surface a truncated cone-shaped part 64 with which the O-ring 48 co-acts.

Only the coupling between two tubes is shown by way of example in the drawings. The invention is not limited to this application.

It will be apparent that many modifications are possible within the scope of the invention.

The invention claimed is:

1. A cylindrical coupling having an interior diameter larger than the outside diameter of a cylindrical member to be coupled, said cylindrical coupling comprising:
   a stop on the interior with an inner diameter less than the outside diameter of the cylindrical member to be coupled;
   a cylindrical shoulder spaced between said stop and a cylindrical coupling opening, said cylindrical shoulder extending into the interior of the cylindrical coupling substantially perpendicular thereto and having an inner diameter at least as large as the outer diameter of the cylindrical member to be coupled;
   a retention ring having an outer diameter substantially the same as an outer diameter of said cylindrical shoulder and an inner edge having a diameter at least as large as said out diameter of said cylindrical member to be coupled, the retention ring including
      a plurality of spaced apart tongues projecting inwardly from said inner edge and axially inwardly of the plane of said retention ring in the direction of insertion of said cylindrical member into said cylindrical coupling, each of said tongues having an inclined end in the form of a partial helix with a sharp protuberance, said retention ring further including projections on its outer circumferential edge for engaging the inner juxtaposed surface of said cylindrical coupling, wherein said projections are embodied as barbed hooks.

2. A cylindrical coupling as set forth in claim 1, wherein said cylindrical coupling further includes a cylindrical fixation ring to engage said retention ring positioned on said cylindrical shoulder.

3. A cylindrical coupling as set forth in claim 1, wherein said stop is annular to engage and prevent said cylindrical member to be coupled from extending beyond a preselect distance from said retention ring.

4. A cylindrical coupling having an interior diameter larger than the outside diameter of a cylindrical member to be coupled, said cylindrical coupling having a stop on the interior with an inner diameter less than the outside diameter of the cylindrical member to be coupled, said cylindrical coupling having a cylindrical shoulder spaced between said stop and cylindrical coupling opening, said cylindrical shoulder extending into the interior of the cylindrical coupling substantially perpendicular thereto and having an inner diameter at least as large as the outer diameter of the cylindrical member to be coupled, a retention ring having an outer diameter substantially the same as an outer diameter of said cylindrical shoulder and an inner edge having a diameter at least as large as said out diameter of cylindrical member to be coupled, a plurality of spaced apart tongues projecting inwardly from said edge and axially inwardly of the plane of said retention ring in the direction of insertion of said cylindrical member into said cylindrical coupling, each of said tongues having an inclined end in the form of a partial helix with a sharp protuberance, said retention ring including projections on its outer circumferential edge for engaging the inner juxtaposed surface of said cylindrical couplings, wherein said projections include barbed hook, wherein said cylindrical coupling includes a sealing ring between the retention ring and the opening to said coupling to sealingly engage said cylindrical member to be coupled and the interior of said coupling.

* * * * *

UNITED STATES PATENT AND TRADEMARK OFFICE
CERTIFICATE OF CORRECTION

PATENT NO. : 8,033,578 B2 Page 1 of 1
APPLICATION NO. : 11/994563
DATED : October 11, 2011
INVENTOR(S) : Gerrit Jan De Wilde It is certified that error appears in the above-identified patent and that said Letters Patent is hereby corrected as shown below:

On the Title Page, please correct the location of the inventor as follows:

Item (75) Inventor:    Gerrit Jan De Wilde, Anerveen
                       (NL)

Signed and Sealed this
Tenth Day of January, 2012

David J. Kappos
*Director of the United States Patent and Trademark Office*